United States Patent [19]

Barzuza

[11] 4,060,483
[45] Nov. 29, 1977

[54] METHOD AND APPARATUS FOR EFFECTING THE CLEANING OF A FLUID FILTER

[76] Inventor: Ytzhak Barzuza, 1 Mevo Bosmat Str.Gilo, Jerusalem, Israel

[21] Appl. No.: 683,487

[22] Filed: May 5, 1976

[30] Foreign Application Priority Data

May 14, 1975 Israel .......................................... 47305

[51] Int. Cl.² ............................................... B08B 9/04
[52] U.S. Cl. .................................... 210/79; 210/413; 210/414
[58] Field of Search ..................... 210/79, 77, 413, 414

[56] References Cited

U.S. PATENT DOCUMENTS

| | | | |
|---|---|---|---|
| 1,803,477 | 5/1931 | Kullander | 210/413 |
| 3,454,164 | 7/1969 | Asper | 210/413 X |
| 3,541,004 | 11/1970 | Cooper et al. | 210/79 X |
| 3,823,831 | 7/1974 | Le Blanc, Jr. | 210/414 X |
| 3,883,431 | 5/1975 | Ishii | 210/79 X |

Primary Examiner—R.E. Serwin
Attorney, Agent, or Firm—Holman & Stern

[57] ABSTRACT

A method for effecting the cleaning of a clogged fluid filtering member in a filtering system situated between an inlet and an outlet port comprising utilizing at least a portion of the fluid to be filtered in said system to impart motion to a movable hollow cleaning body provided therein in fluid communication with a valved cleaning outlet and to carry matter unable to pass through said filtering member into a fluid intake portion of said cleaning body and out said cleaning outlet. Also provided is a fluid filter system comprising a housing having an inlet port, an outlet port and a valved cleaning outlet, said housing defining a fluid passage between said ports via a filtering member; a hollow filter cleaning body movably mounted within said housing and having at least one fluid intake portion adapted to move in close proximity to the surface of the filtering member and to provide a fluid flow path between said intake portion and said valved cleaning outlet; and a fluid responsive means positioned in said flow path adapted to cause the movement of said cleaning body; the arrangement being such that when said filter is at least partly clogged said valved outlet is opened causing fluid to flow via said intake portion through said hollow body into said cleaning outlet and thereby to actuate said fluid response means to cause the movement of said cleaning body.

15 Claims, 7 Drawing Figures

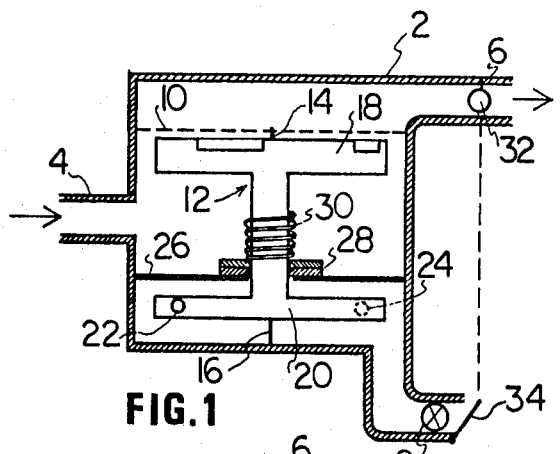
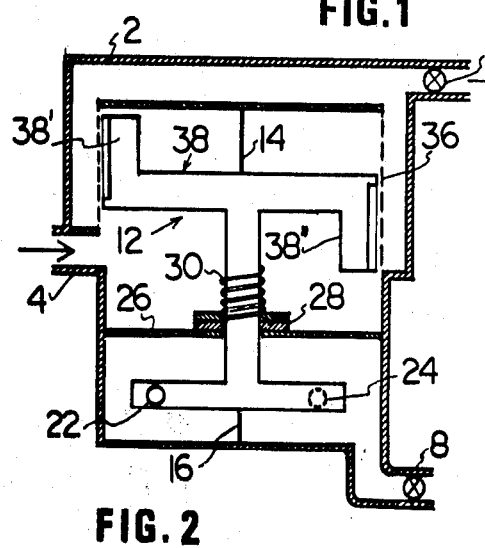
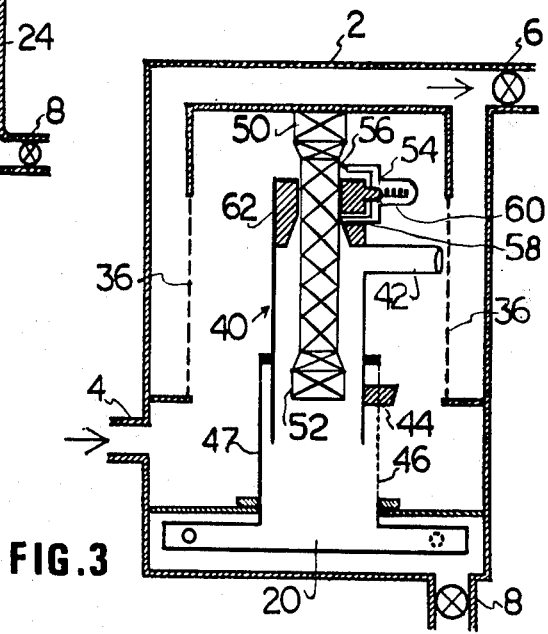

METHOD AND APPARATUS FOR EFFECTING THE CLEANING OF A FLUID FILTER

The present invention relates to a method and apparatus for effecting the cleaning of a clogged fluid filtering member in an automatic fluid filter cleaning system.

There are known in the art a great number of fluid filter cleaning devices, for example, filter units, employing one or more brushes which are adapted to scrape the surface of the filtering member either manually, or automatically by means of an auxiliary motor or water pump. These devices suffer from the drawback of poor cleaning since the movable brushes do not effectively loosen and free the dirt stuck in the filter's small holes and moreover such an arrangement requires an auxiliary driving motor which, on the one hand, contributes to the cost of such filters and on the other hand, makes the filters inoperable in places, e.g., fields, where no electric energy for energizing said motor is available.

It is therefore an object of the present invention to devise an effective low-cost fluid filter cleaning method and system which overcomes the above mentioned and other disadvantages.

According to the invention there is provided a method for effecting the cleaning of a clogged fluid filtering member in a filtering system situated between an inlet and an outlet port comprising utilizing at least a portion of the fluid to be filtered in said system to impart motion to a movable hollow cleaning body provided therein in fluid communication with a valved cleaning outlet and to carry matter unable to pass through said filtering member into a fluid intake portion of said cleaning body and out said cleaning outlet.

The invention further provides a fluid filter cleaning system comprising a housing having an inlet port, an outlet port and a valved cleaning outlet, said housing defining a fluid passage between said ports via a filtering member; a hollow filter cleaning body movably mounted within said housing and having at least one fluid intake portion adapted to move in close proximity to the surface of the filtering member and to provide a fluid flow path between said intake portion and said valved cleaning outlet; and a fluid responsive means positioned in said flow path adapted to cause the movement of said cleaning body; the arrangement being such that when said filter is at least partly clogged said valved outlet is opened causing fluid to flow via said intake portion through said hollow body into said cleaning outlet and thereby to actuate said fluid response means to cause the movement of said cleaning body.

Thus with the present method and system the energy of the fluid flowing inside the system is utilized for the actuation of the cleaning action and furthermore this energy is also used for imparting motion to the movable cleaning body.

The cleaning body itself is so designed as to create a strong and effective suction action on successive portions of the filtering member. Hence in order to clean the entire surface of the filtering member it is necessary to move the relatively small fluid intake portion of the cleaning member along the surface of said member. This may be achieved by imparting said intake portion or the entire cleaning body with a rotational, axial or combined rotational and axial motion. The exact type of motion may be dictated by various factors such as the configuration of the filtering member and the cleaning body, the desired size and shape of the filtering unit and the fluid pressure of the line. It can therefor be appreciated that while the cleaning body and in particular the fluid intake portion thereof should be restricted in size for applying a strong localized suction action on the filtering surface, the latter can have a relatively large area and thus be capable of filtering fluid of a substantial high rate of flow.

The above and other features of the invention will be described in greater detail hereinafter with reference to the accompanying drawings in which:

FIG. 1 is a sectional side view of a fluid filtering system according to one embodiment of the invention;

FIG. 2 is a sectional side view of a fluid filtering system according to another embodiment of the invention;

FIG. 3 is a sectional side view of a different embodiment of a fluid filtering system;

Figure 4:
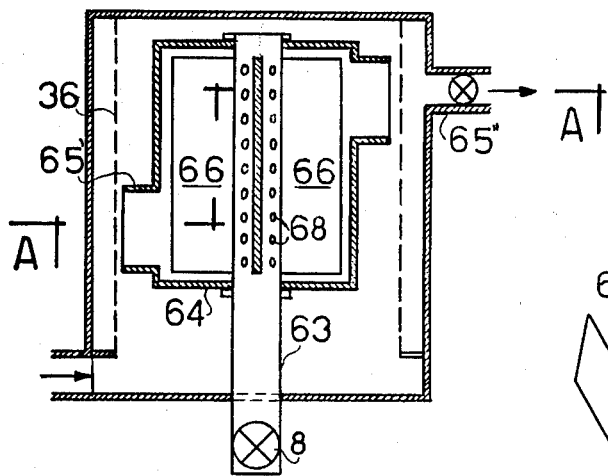
FIG. 4 is a sectional side view of still a further embodiment of a fluid filtering system.

With reference first to FIG. 1, there is shown a fluid filtering system which comprises a housing 2, having an inlet port 4, an outlet port 6 and a valved cleaning outlet 8. Inside housing 2, there is situated a filtering member 10 which member can be a simple mesh-like net or membrane, shaped as a disc or cylinder and made of metal, cloth, synthetic materials or the like, and a hollow filter cleaning body 12 which is movably mounted in said housing. The cleaning body 12 shown in this figure is rotatably mounted within the housing by means of axes 14 and 16. Body 12 includes a fluid intake portion 18 situated and adapted to move in close proximity to the upstream directed surface of the filtering member 10 and a fluid responsive means 20 which is adapted to react to fluid flowing through the body and to cause a rotational movement of said body. In the embodiment shown, this rotational movement is achieved by two oppositely disposed spaced apart exhaust passages or apertures 22 and 24, made in a substantially axial conduit, which react to the fluid flowing therefrom in the same manner as that of a spinning-jet sprinkler.

In order to prevent fluid from flowing from the inlet port 4 directly to the cleaning outlet 8, the housing 2 is divided by a partition 26 into two separate chambers. The gap between the rotational body 12 which passes through said partition is sealed off by means of a fluid-tight gasket 28 retained in place by means of a metal or the like annular disc with or without a spring arrangement 30.

The valved cleaning outlet 8 may be a pressure responsive valve which is adapted to open when the pressure inside the housing exceeds a preset amount whenever the filtering member 10 is clogged. This type of valved outlet enables the system to perform as an automatic self-cleaning filter whenever the filter is at least partly clogged. It is also advantageous to install in the fluid outlet port 6 a valve means which may coact with valved cleaning outlet 8 so as to close whenever the latter is opened. In the embodiment shown, such valve means comprise a rotatable disc 32 mechanically coupled to a flap 34 which flap is hinged to the cleaning outlet 8. Thus, when the filter member is at least partly clogged, the pressure responsive valve in cleaning outlet 8 is opened, the fluid passing therethrough deflect flap 34 which in turn rotates disc 32 in outlet 6 so as to close the outlet and to divert the fluid back into the housing toward the fluid intake portion of the cleaning body. The fluid flowing through and adjacent the filtering member into the hollow body and out the cleaning outlet will impart the latter with a rotational movement whereby the entire filtering member will be sequentially acted upon by the fluid intake portion. The matter unable to pass through the filtering member and the matter stuck therein during the filter's regular operation will thus eventually be sucked out and washed away via the cleaning outlet.

If desired the fluid intake portion of the cleaning body may be fitted with scraping and/or brushing elements for added cleaning effect.

Turning now to FIG. 2 there is shown a slightly modified configuration of the filtering member and consequently of the intake portion of hollow body 12. As seen in the figure, filtering element 36 is of a cylindrical shape and the rotatable intake portion 38 has two oppositely extending arm sections 38', 38" adapted to successively move along different segments of said cylindrical filtering member. While this arrangement of the cleaning body 12 provides a balanced rotatable arrangement, it can be realized that on the one hand one intake arm, extending along the entire height of the filtering member, could just as well be provided and on the other hand, a multiple e.g. four fluid intake arms 38 and several branches of the fluid responsive means 20 could also be made.

FIG. 3 illustrates a possible arrangement whereby a combined axial and rotational movement can be imparted to a cleaning body 40. Accordingly body 40 has a fluid intake nozzle 42 which is telescopically coupled by means of a pin 44 guided in a slot 46 which slot is made in the upwardly extending portion 47 of the fluid responsive means 20. The intake nozzle 42 is adapted to move around a stationary two way threaded stem 48, having enlarged portions 50 and 52 at its end sections. This movement is achieved by means of a "U" shaped guiding element 54, having two guiding wedged parts 56 and 58. Element 54 is resiliently pivotally mounted at 60 on a sleeve 62 surrounding a portion of the stem 48 and attached to the body 40. When fluid flows through responsive means 20, the latter is caused to rotate, pin 44 will in turn impart a similar rotational movement to fluid intake nozzle 42 and said nozzle will be guided in an upwards or downwards direction along the threaded stem 48, depending on which of the wedged parts presently engages said stem. Upon reaching one of the enlarged sections of the stem, element 54 will pivot about point 60 to cause the other of the wedges to engage the guiding threads and in turn the axial movement of nozzle 42 will be reversed in direction. Here again, the fluid intake portion 42 may comprise more than a single nozzle of any expedient configuration.

In one possible modification of a system in which the cleaning body has imparted to it an axial and/or a combined axial and rotational movement, it is contemplated to provide a hydraulically actuated valve installed in the cleaning outlet 8 also for the purpose of driving a cleaning body which may be operationally linked thereto. This can be achieved by a diaphragm or piston actuated valve built inside the filter in such a way that when the filter is clogged said valve is automatically opened and axially displaced inside the filter. Thus, when said outlet is opened and the cleaning fluid intake nozzle is thereby caused to rotate, it is simultaneously imparted with an axial movement so as to move along and clean the entire surface of a filtering member.

Figure 4A:
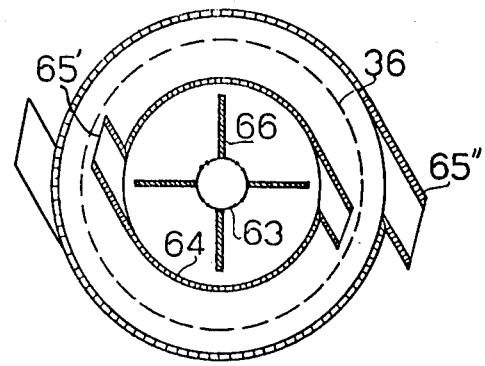
FIG. 4A is a cross sectional view along line A-A of FIG. 4.

In FIGS. 4 and 4A there is illustrated a slightly modified fluid responsive means. It consists of a stationary hollow tubular body 63 closed at its upper end and communicating at its lower end with the valved outlet 8. The body 63 is adapted to support a rotational cylindrical cleaning body 64 having two diametrically disposed intake nozzles 65' and 65" and a plurality of fluid directing flaps 66 mounted thereon.

When the filtering member 36 is clogged, the valved outlet 8 is opened, and there is formed a fluid path from the interior of the filter through the intake nozzles 65' and 65" via openings 68 made in the section of the hollow tubular body 63 encased by the cleaning body 64 and out the open outlet 8. The fluid entering under pressure into the intake nozzles 65', 65" impinge on the walls of the body 64 and on the flaps 66 and cause the entire cleaning body 64 to revolve about the tubular body 63. The matter unable to pass through the filtering member and the matter struck therein will thus be sucked out and washed away via the openings 68 and the cleaning outlet 8.

Figure 5:
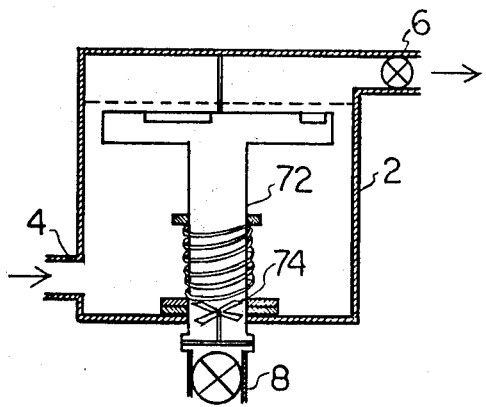
FIG. 5 is a sectional side view of a fluid filtering system having an impeller type fluid responsive means.

In FIG. 5 there is shown still a further motion imparting means, whereby a cleaning body 72 is rotationally moved when fluid passes therethrough. The means comprise an impeller 74 fixedly attached to the inner side of the body 72. Cleaning outlet 8 is in this case situated along the flow path of fluid inside the hollow cleaning body 72. As can readily be seen, when the valve in the outlet 8 is opened, fluid passing through the hollow body 72 will impinge on the angled vanes of impeller 74 and cause the entire body to rotate.

Figure 6:
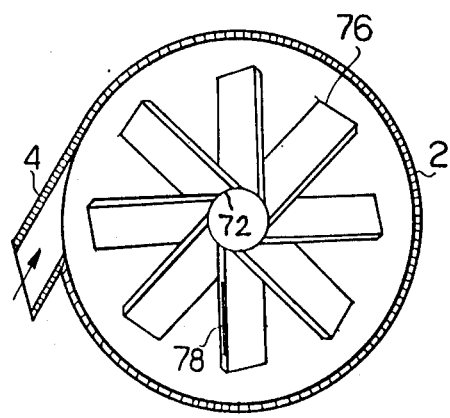
FIG. 6 illustrates a different impeller type fluid responsive means for use in the system shown in FIG. 5.

Instead of or in addition to the impeller 74, the body 72 can be provided with an outside impeller 76 as shown in FIG. 6. The fluid entering the housing 2 via an angled inlet port 4 impinges on the vanes of impeller 76 and causes the rotation of body 72. If desired at least one of the impeller's vanes e.g. part 78 can constitute the fluid intake path leading to the interior of the body 72 and thus serve the dual purpose of a motion imparting means as well as that of a fluid intake portion.

While particular embodiments of this invention have been described and shown with reference to the attached figures, it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for effecting the cleaning of a clogged fluid filtering member in a filtering system situated between an inlet and an outlet port comprising utilizing at least a portion of the fluid to be filtered in said system to impart motion to a movable hollow cleaning body provided therein in fluid communication with a valved cleaning outlet and to carry matter unable to pass through said filtering member into a fluid intake portion of said cleaning body and out said cleaning outlet, said hollow body is imparted said motion by virtue of the fluid flow in the path established through said hollow body between said fluid intake portion and said cleaning outlet when the normally closed valved cleaning outlet is opened.

2. A method for cleaning a fluid filter comprising providing a housing having an inlet port, an outlet port and a filtering member situated in the fluid passage between said ports with a valved cleaning outlet adapted to be opened when said filter is at least partly clogged and with a movably mounted hollow cleaning body having a fluid responsive means and at least one fluid intake portion adapted to move in close proximity to the surface of said filtering member and to provide a fluid flow path between said intake portion and said valved cleaning outlet wherein the flow of fluid from said intake portion to said cleaning outlet is adapted to cause the movement of said fluid responsive means which in turn moves said fluid intake portion along the surface of said filtering member, at least a portion of said fluid flow being caused to flow through said fluid intake portion and carry with it matter unable to pass through said filtering member.

3. The method as claimed in claim 2 wherein said valved cleaning outlet is automatically opened by a control means when said filtering member is at least partly clogged.

4. The method as claimed in claim 3 wherein the opening of said control means is a pressure responsive valve.

5. The method as claimed in claim 2 wherein said movement is an axial, rotational or combined axial and rotational movement.

6. A fluid filter cleaning system comprising:
   a housing having an inlet port, an outlet port and a valved cleaning outlet, said housing defining a fluid passage between said ports via a filtering member;
   a hollow filter cleaning body movably mounted within said housing and having at least one fluid intake portion adapted to move in close proximity to the surface of the filtering member and to provide a fluid flow path between said intake portion and said valved cleaning outlet; and
   a fluid responsive means positioned in said flow path adapted to cause the movement of said cleaning body;
   the arrangement being such that when said filter is at least partly clogged said valved outlet is opened causing fluid to flow via said intake portion through said hollow body into said cleaning outlet and thereby to actuate said fluid responsive means to cause the movement of said cleaning body.

7. The system as claimed in claim 6 wherein said fluid responsive means is one or more exhaust passages extending from the hollow body for rotation of the body when fluid flows therethrough.

8. The system as claimed in claim 7 wherein said exhaust passages are branched passages extending from said hollow body in a substantially perpendicular direction therefrom.

9. The system as claimed in claim 6 wherein said fluid responsive means is an impeller mounted within said hollow body.

10. The system as claimed in claim 6 wherein said fluid responsive means is an impeller mounted on said hollow body.

11. The system as claimed in claim 10 wherein said impeller comprises a set of angled vanes.

12. The system as claimed in claim 11 wherein said fluid intake portion constitutes one of the impeller vanes.

13. The system as claimed in claim 6 wherein said body is adapted to move in a combined rotational and axial direction along the surface of said filter member.

14. The system as claimed in claim 6 wherein said outlet port includes a valve adapted to close when said valved cleaning outlet is opened.

15. The system as claimed in claim 6 when valved outlet is a pressure responsive outlet.

* * * * *